United States Patent Office 2,742,977
Patented Apr. 24, 1956

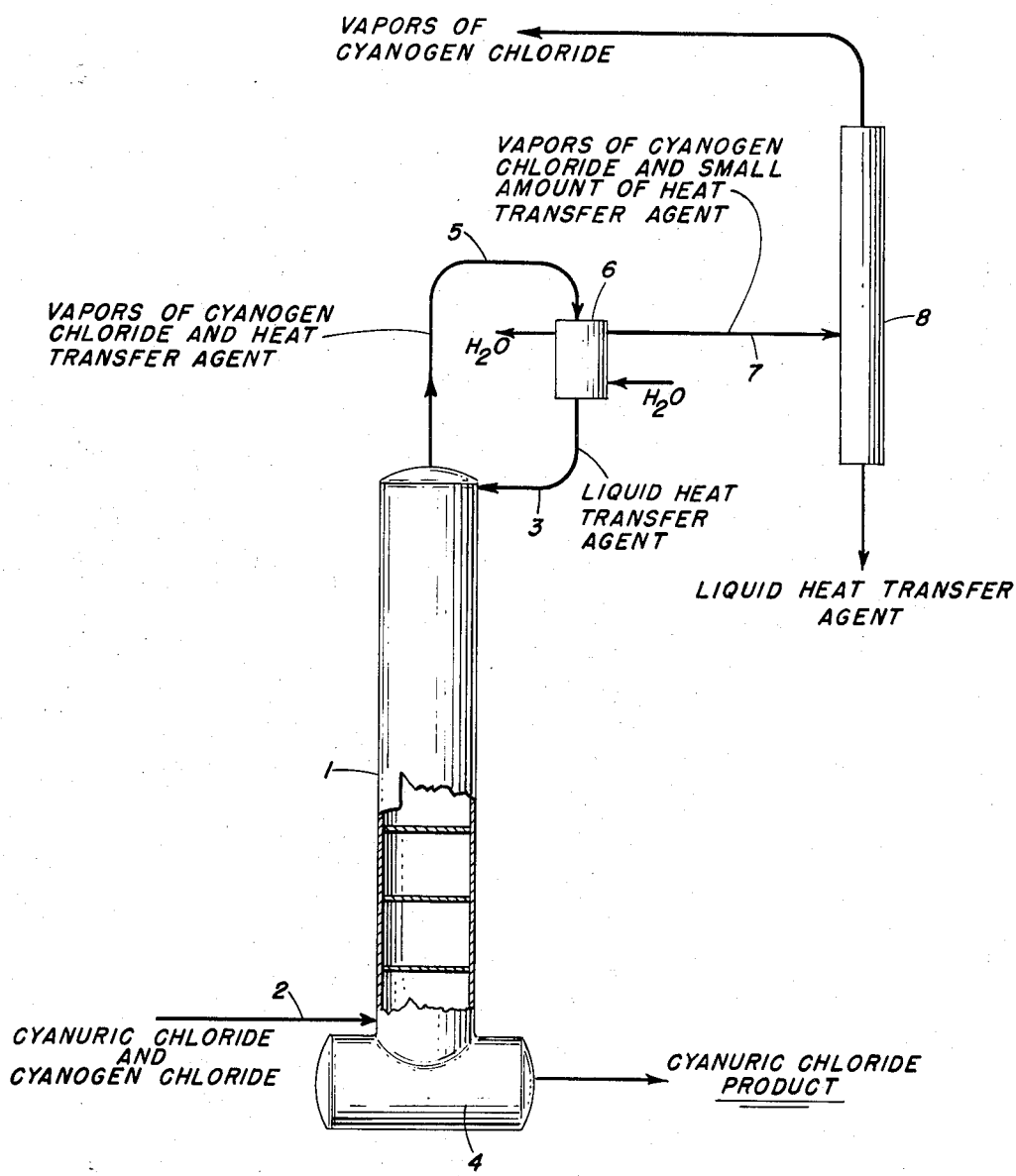

2,742,977

PROCESS FOR RECOVERING SOLID CYANURIC CHLORIDE

Stewart F. Williams, Wilton, and Arthur Sedoff, Old Greenwich, Conn., assignors to American Cyanamid Company, New York, N. Y., a corporation of Maine Application June 11, 1954, Serial No. 436,238

10 Claims. (Cl. 183—120)

This invention relates to cyanuric chloride. More particularly it relates to cyanuric chloride prepared by a process for the catalytic conversion of cyanogen chloride to cyanuric chloride, and still more particularly it relates to a novel process of recovering cyanuric chloride solids from a vapor stream comprising cyanuric chloride vapor.

In the known method for the catalytic conversion of cyanogen chloride to cyanuric chloride by means of a fixed bed process, the off-gases carry compounds which are necessarily in the vapor state. These off-gases carry primarily the product, cyanuric chloride as a vapor, along with a certain amount of unconverted cyanogen chloride. The amount of cyanogen chloride present in the reactor off-gases may be controlled by changing the conditions in the reactor so as to accomplish a more or less complete conversion of cyanogen chloride to cyanuric chloride.

Once the conversion has been carried out to the desired extent there remains the problem of recovering the product, solid cyanuric chloride, from the vapor stream. This may be accomplished by one of several processes.

One of the processes for converting cyanuric chloride vapor to cyanuric chloride solids is by means of a desublimer. In this process the cyanuric chloride vapor is passed into the desublimer wherein the cyanuric chloride is converted to a solid without first passing through the liquid state. Such a process has been widely used in the past. However, this process calls for large cooling surface area and also for refrigeration in order that the walls of the vessel may be sufficiently cold to accomplish the desublimation. Since refrigeration is relatively costly compared with water-cooling such constitutes a disadvantage of the desublimation system. Furthermore, a very fine-sized product is formed; this causes a dust collection problem. Hence, cyanuric chloride so-obtained is a dusty, lachrymatory material which is difficult to handle in collection bins, hoppers, packers, and the like. In addition, the use of a desublimer may demand large quantities of diluent gas such as cyanogen chloride in order that those conditions may be met which will allow the conversion of cyanuric chloride vapor direct to cyanuric chloride solids. This diluent gas must be recycled to the reactor or otherwise disposed of, thus creating a problem of materials handling. Finally, the use of a desublimer gives rise to the problem of maintaining the walls free of deposited material in order that adequate heat transfer can take place.

Another method of obtaining cyanuric chloride solids from cyanuric chloride vapor is the condensation of cyanuric chloride vapor with liquid cyanogen chloride. Here too, however, refrigeration must be supplied, and an extremely fine product is formed which is difficult to collect.

Still another process of obtaining cyanuric chloride solid from cyanuric chloride vapor is to pass the vapor stream through a tubular condenser under conditions to obtain high gas velocities. The principal disadvantage of this method is that insufficient velocity may be obtained under practical pressure drops to keep the tubes from fouling.

It is the principal object of the present invention to supply a process which eliminates the above-described disadvantages. It is a further object of the present invention to supply a process for the recovery of cyanuric chloride solids from cyanuric chloride vapor which utilizes the usual cooling-water as a means of removing heat and which disposes of the problem of fouling and fine-sized product formation.

These objects are achieved in a surprisingly straightforward manner. The vapor stream comprising cyanuric chloric vapor is contacted with an inert liquid heat transfer agent. The amount of the agent contacted with the vapor stream is so chosen that substantially all of the liquid heat transfer agent is converted to inert vapor while, at the same time, substantially all of the cyanuric chloride vapor is converted to cyanuric chloride liquid. The liquid cyanuric chloride is then cooled by any convenient means to recover cyanuric chloride solids in any desired form. The inert vapor formed from the vaporization of the inert liquid heat transfer agent is then cooled to change the inert vapor into the inert liquid heat transfer agent. This cooled inert agent is then recycled to the contacting step wherein it is revaporized by more of the incoming gas stream containing cyanuric chloride vapor.

A diagrammatic drawing in which the sole figure is a vertical, sectional view of one type of apparatus that can be used in practicing the invention, is presented to further elucidate the process of the present invention. As shown in the drawing, the first step in the process is the contacting of the vapor stream containing cyanuric chloride vapor with an inert liquid heat transfer agent. The contact is carried out in a column 1. The vapor stream enters through a line, 2, at the bottom of the column while the heat transfer agent enters through a line, 3, at the top of the column; contact between the two is direct. The amount of the inert heat transfer agent is so chosen that the heat withdrawn from the incoming vapor stream to vaporize the heat transfer agent is sufficient to allow the condensation of cyanuric chloride vapor to cyanuric chloride liquid. Additional agent over and above this amount will pass down the column, thus aiding in the collection of cyanuric chloride at the bottom. Should the volume of the vapor stream increase or decrease due to fluctuations in the reactor, or should the cyanuric chloride content of the vapor stream change, it is a simple matter to vary the amount of heat transfer agent in accordance with the change in vapor stream conditions. Any heat transfer agent unvaporized by the heat in the cyanuric chloride vapor will fall as a liquid to the bottom of the column where it may readily be converted to a vapor by a reboiler, 4. Thus the heat transfer agent is substantially completely converted to a vapor by heat from either the cyanuric chloride vapor alone, or by the heat from cyanuric chloride vapor plus heat from the reboiler.

The choice of inert liquid heat transfer agents will depend to some extent on the conditions existing in the vapor stream. The saturated hydrocarbons make up the preferred class of heat transfer agents, although such compounds as s-tetrachloroethane may be used. For a reactor off-gas at a temperature of about 400° C. and containing 90–95% cyanuric chloride by weight, it is preferred to use toluene or a xylene or a mixture of xylenes. Particularly with off-gases at a higher temperature, however, it may be preferred to use an inert hydrocarbon having a higher heat of vaporization than have the preferred compounds mentioned here. In any case, the inert heat transfer agent may be defined as having a boiling point intermediate between that of cyanogen chloride and cyanuric chloride, and chemically inert toward those two compounds.

The contacting step, then, changes the cyanuric chloride vapor to cyanuric chloride liquid while at the same time changing the heat transfer agent from a liquid to a vapor. In the preferred system wherein a column is used the liquid cyanuric chloride collects at the bottom of the tower. It is desirable to have a reboiler or heat exchange element at the bottom of the tower in order that heat may be withdrawn or added to the pool of cyanuric chloride liquid. The heat exchanger may be used to vaporize any heat transfer agent that gets to the bottom. Such a reboiler enables an appreciable degree of control over the conditions existing in the column since it can be used to vaporize heat transfer agent in excess of that vaporized by the available heat in the cyanuric chloride vapor.

The liquid cyanuric chloride may then be cooled and crystallized in any convenient manner. In the preferred system of using a column for the contacting step, the cyanuric chloride liquid would be removed from the bottom of the tower and passed to a flaker roll in order to obtain the cyanuric chloride solids in the form of flakes. As an alternative, the liquid cyanuric chloride may be passed directly into an inert cooled liquid and the resulting cyanuric chloride solids recovered therefrom. Solids so obtained are not as objectively fine as they are when the cyanuric chloride vapor is passed into a cooled liquid. Convenience and the particular size and shape of the cyanuric chloride solids desired will dictate which of the various cooling and solids recovery steps will be most desired.

As mentioned earlier, substantially all of the inert heat transfer agent is changed into inert vapor by the heat in the incoming vapor stream. Using a column, 1, as illustrative of the preferred apparatus in which to carry out the contacting step, the inert vapor mixture passes out of the column at the top through line 5 of the drawing. The inert vapor mixture is then cooled to change the heat transfer agent back to the liquid state. This cooling may be readily accomplished in an ordinary condenser, 6, which is cooled by cooling water at ambient conditions. This is one of the outstanding advantages of the process of the present invention. Substantially the entire amount of heat in the incoming vapor stream is removed by the cheapest of all cooling methods, a water cooled condenser. Thus the inert heat transfer agent serves as an intermediate to carry the heat away from the incoming vapor stream and to release that heat to the cooling water.

The cooled heat transfer agent in the form of a liquid flowing through line 3 is then returned to the top of the column whereupon it undergoes revaporization. This completes the cycle for the heat transfer agent.

Any unconverted cyanogen chloride or other non-condensables will pass as a gas, shown in the diagram as line 7, through the water-cooled condenser. Due to the vapor pressure of the heat transfer agent, some of the agent will be swept along as a vapor with the cyanogen chloride. It is desirable to distill this stream to recover both the heat transfer agent and the cyanogen chloride from distillation column 8. Such a system prevents the undue loss of heat transfer agent in the cyanogen chloride. The cyanogen chloride product from this fractionation may be cooled if desired and then recycled to the reactor.

If the off-gases from the reactor contain lesser amounts of cyanuric chloride vapor the rest comprising cyanogen chloride, then a larger gas stream would be fractionated after removal from the condenser in which the heat transfer agent is cooled.

It should be noted that one of the great advantages of the process of the present invention is that simple and readily available equipment may be used throughout. The process is carried out at substantially atmospheric pressure, although elevated pressures may be used if desired. Furthermore, the various steps that make up the process of the present invention involve a minimum of delicate control.

The following example illustrates without limiting the process of the present invention.

*Example*

Into a column measuring 2.5' in diameter and 20' high is passed a stream of off-gases from a catalytic reactor in which cyanogen chloride is converted to cyanuric chloride. The stream of vapors enters the column near the bottom. The rate of feed of the vapor stream is 1,693 pounds cyanuric chloride per hour with which is admixed 120 pounds unconverted cyanogen chloride. The temperature of the vapor stream is 400° C.

At the top of the column there is added 2300 pounds per hour of toluene to serve as an inert heat transfer agent.

At steady state a pool of cyanuric chloride liquid has formed at the bottom of the column. A heat exchanger in the bottom of the column aids in maintaining the liquid cyanuric chloride at a temperature close to the boiling point of 194° C. The cyanuric chloride liquid is removed at the rate of 1,693 pounds per hour and is admitted to a 200 gallon holding tank equipped with a steam coil. The cyanuric chloride liquid is removed from the holding tank at the rate of 3 gallons per minute and is fed to a totally enclosed flaker having a roll measuring 4.25 by 3 feet. The roll is cooled by water fed at the rate of 20 gallons per minute. A screw conveyor removes the cyanuric chloride solids in flake form whereupon the solids are packaged.

Coming off the top of the above described column in the form of a vapor at about 110° C. is a stream containing all of the vaporized toluene and all of the unconverted cyanogen chloride mixed therewith. This stream passes to a condenser. The condensate from the toluene condenser passes to a separator. The 2300 pounds of toluene plus dissolved cyanogen chloride is recycled to the top of the column. The 120 pounds of cyanogen chloride in vapor form along with 180 pounds of toluene vapor is removed from the top of the separator; this 180 pounds of toluene is due to the vapor pressure of toluene at 88° C., the temperature to which the toluene is cooled. The toluene-cyanogen chloride mixture is passed into the center of a 10' high column having a diameter of 1'. A heat exchanger in the bottom maintains the toluene pool at its boiling point of 110° C. The toluene is then returned as a liquid to the sepaartor at the rate of 180 pounds per hour and then is passed back to the column in which it is contacted with cyanuric chloride vapor. 120 pounds per hour of cyanogen chloride gas is removed from the top of the toluene-cyanogen chloride separation column and is recycled to the reactor.

We claim:

1. In the process of recovering cyanuric chloride solids from a vapor stream comprising cyanuric chloride vapor the steps which comprise: contacting said vapor stream with an inert liquid heat transfer agent in an amount such that substantially all of said inert liquid heat transfer agent is converted to inert vapor and substantially all of cyanuric chloride vapor is converted to cyanuric chloride liquid; cooling said cyanuric chloride liquid to recover cyanuric chloride solids therefrom; cooling said inert vapor to recover inert liquid heat transfer agent therefrom; and recycling said cooled inert liquid heat transfer agent to said contacting step.

2. The process according to claim 1 wherein said inert liquid heat transfer agent is toluene.

3. The process according to claim 1 wherein said inert liquid heat transfer agent is a xylene.

4. The process according to claim 1 wherein said cooling of said cyanuric chloride liquid is accomplished by means of a flaker roll.

5. The process according to claim 1 wherein said contacting step is carried out in a column.

6. A process according to claim 1 wherein said cooling of said inert vapor is accomplished by indirect heat exchange with water at ambient conditions.

7. In the process of recovering cyanuric chloride solids from a vapor stream comprising cyanuric chloride vapor, the steps which comprise: treating said vapor stream with sufficient inert liquid heat transfer agent to change said cyanuric chloride vapor to cyanuric chloride liquid and to change a portion of said inert liquid heat transfer agent to an inert vapor; supplying heat to change the remaining portion of said heat transfer agent into inert vapor; passing said cyanuric chloride liquid to a cooled flaker roll to recover cyanuric chloride solids therefrom; condensing all of said inert vapor to recover inert liquid heat transfer agent therefrom; and recycling said condensed agent to said treating step.

8. In the process of recovering cyanuric chloride solids from a vapor stream comprising a mixture of cyanuric chloride vapor and cyanogen chloride vapor, the steps which comprise: contacting said vapor stream with an inert liquid heat transfer agent in an amount such that substantially all of said inert liquid heat transfer agent is converted to inert vapor and substantially all of said cyanuric chloride vapor is converted to cyanuric chloride liquid; cooling said cyanuric chloride liquid to recover cyanuric chloride solids therefrom; cooling said inert vapor comprising a mixture of inert gaseous heat transfer agent and gaseous cyanogen chloride to below about the boiling point of said agent thereby recovering (a) inert heat transfer agent as liquid and (b) a mixture of cyanogen chloride vapor and residual inert heat transfer agent as vapor; cooling the latter vapor mixture to above about the boiling point of cyanogen chloride as vapor; combining all the recovered liquid inert heat transfer agent; and recycling said recovered agent to said contacting step.

9. A process according to claim 8 wherein said inert heat transfer agent is toluene.

10. A process according to claim 8 wherein said inert liquid heat transfer agent is a xylene.

References Cited in the file of this patent

UNITED STATES PATENTS

| | | |
|---|---|---|
| 2,118,438 | Lawrence et al. | May 24, 1938 |
| 2,446,181 | Kraus | Aug. 3, 1948 |
| 2,448,868 | Davis | Sept. 7, 1948 |
| 2,491,459 | Thurston | Dec. 13, 1949 |
| 2,657,979 | Saladin et al. | Nov. 3, 1953 |
| 2,675,890 | Frey et al. | Apr. 20, 1954 |
| 2,675,891 | Frey | Apr. 20, 1954 |